United States Patent Office 3,520,707
Patented July 14, 1970

3,520,707
WATER REDUCING AND RETARDING ADMIXTURES FOR PORTLAND CEMENT SLURRIES
John C. Steinberg, Kenneth R. Gray, and John Kelvin Hamilton, Shelton, Wash., assignors to Rayonier Incorporated, Shelton, Wash., a corporation of Delaware
No Drawing. Filed May 24, 1967, Ser. No. 640,832
Int. Cl. C04b 13/24
U.S. Cl. 106—93    12 Claims

ABSTRACT OF THE DISCLOSURE

The setting of portland cement concrete and other portland cement slurries is retarded, the water content of the slurry is reduced and the strength of the concrete is increased by incorporating in the slurry composition a small quantity of a water reducing and retarding admixture comprising a hydrolyzate obtained by the partial hydrolysis of the hemicellulose constituents of wood chips. The hydrolyzate consists predominantly of short chain polymers of the non-cellulose carbohydrate constituents resulting from the hydrolysis of wood chips, and advantageously may be subjected to an alkaline treatment to reduce the free (monomeric) sugar content thereof.

BACKGROUND OF THE INVENTION

It has long been known that simple sugars such as glucose, mannose and sucrose will retard the setting of concrete and other portland cement slurries, and will reduce the water requirement for workable slurries thereby producing increased strength in the final portland cement composition. In practice, however, there are disadvantages which tend to restrict and even prohibit the use of simple sugars as water-reducing and retarding admixtures in portland cement concretes or mortars. For example, these sugars have such strong retarding tendencies that, even for applications in which some retardation is desired, the dosage necessary to achieve this retardation is so low that water reduction and consequent strength improvement are inconsequential.

SUMMARY OF THE INVENTION

We have made the surprising discovery that partial selective hydrolysis of coniferous or deciduous woods, in which the noncellulose carbohydrate hydrolyzates are predominantly in the form of short chain polymers rather than simple sugars, yields admixtures having markedly less retarding tendency than simple sugars, so that the dosage in portland cement concrete or slurries necessary to effect the desired amount of retardation is sufficient that water reduction and consequent strength improvement are quite appreciable. Specifically, we have found that when a small quantity of a water reducing and retarding admixture comprising the aforementioned hydrolyzate is incorporated in portland cement concrete or slurry compositions, the setting of the composition is significantly retarded, thus permitting a significant reduction in the water content of the composition with a corresponding improvement in the strength of the ultimate concrete (or other) product. The amount of the hydrolyzate incorporated in the slurry is preferably from about 0.10 to about 0.35% by weight solids based on the cement content of the composition, and the hydrolyzate may advantageously be subjected to an alkaline treatment to reduce the free sugar content thereof as hereinafter described.

DETAILED DESCRIPTION

In softwoods, the hemicellulose fractions are essentially hexosan constituents, largely glucomannans and galactocomannans. In hardwoods, the hemicellulose fractions are essentially pentosans, largely O-acetyl 4-O-methylglucuronoxylans. In our process, the coniferous or deciduous woods in subdivided form (e.g., chips or sawdust) are subjected to a partial selective hydrolysis by means of steam or water under conditions of time and temperature which will largely solubilize the hemicelluloses without breaking them down into free sugars. Procedures for accomplishing the aforementioned partial hydrolysis of the hemicellulose constituents of wood are well known in the art. The ratio of hemicellulose carbohydrates to free sugars in the hydrolyzate is determined by known methods of chromatographic analysis for combined by known methods of chromatographic analysis for combined and free sugars.

In a preferred embodiment of our invention, softwood (e.g., southern yellow pine) chips are subjected to hydrolytic treatment with steam or hot water for periods of 15–60 minutes at temperatures of 140–200° C. Generally speaking, the time of treatment will vary inversely with the temperature. In a typical example, the chips would be heated with direct steam to 175° C. over a 45-minute period and retained at that temperature for 45 minutes. The hydrolyzed chips are drained and advantageously washed to recover the hydrolyzate used in the practice of our invention. The washed chips are suitable for the production of pulp by the Kraft process.

Alternatively, softwood and/or hardwood chips would be subjected to the action of high pressure steam for very brief periods (e.g., 1–2 minutes at 280° C.) following which the pressure would suddenly be relieved causing the chips to explode into fibers. The fibers would then be washed with water to recover hydrolyzate in dilute form. Hydrolyzate produced in this manner is a by-product from one commercial process for the production of hardboard.

In order to minimize shipping costs and facilitate use in concrete, the hydrolyzates will usually be concentrated to 50–70% solids in conventional evaporators.

While sugars are considered undesirable in concrete, for reasons previously given, it is not necessary that the partial wood hydrolyzate used in our invention be entirely free of simple sugars. Nevertheless, an optional feature of our invention relates to subjecting the hydrolyzates to mild alkaline treatment whereby the free sugar content is minimized and products of decreased viscosity are obtained. When employed in concrete or mortar, these modified products of relatively low free sugar content exhibit a more uniform and reproducible behavior, and effect less retardation of setting them is experienced when the unmodified hydrolyzates are employed. Decreased viscosity improves the handling characteristics of the products at high concentration, thus facilitating their use in concrete and mortar.

The mild alkaline treatment is advantageously effected through the use of sodium hydroxide in amounts up to 14% of the hydrolyzate solids. The reaction is carried out at temperatures of 25–105° C., reaction time being adjusted so that alkali consumption, as measured by pH, is essentially complete (e.g., final pH of 7.5–9.0). In general, the reaction time will be inversely proportional to the reaction temperature. Thus, at temperatures of 70–105° C., the reaction time will typically be 15–60 minutes. For economic reasons the alkaline treatment is advantageously conducted at high solids concentration (e.g., 50–65%). Use of lower concentrations leads to increased shipping costs and increases the volumetric dosage (fluid ounces per sack of cement) which must be used in the manufacture of concrete or mortar. The viscosity of the reaction mixture, particularly in the early stages of reaction, tends to be excessive when the solids concentration is above 65%. High viscosity, in turn, increases the electrical energy requirement for adequate mixing and pumping, and may induce foaming.

The alkaline treatment may also be effected with potassium hydroxide, calcium hydroxide or magnesium hydroxide. However, when calcium or magnesium hydroxide is employed, insoluble residues are formed. Since most users of concrete or mortar admixtures prefer a totally soluble product, these residues must generally be removed (e.g., by filtration).

If desired, the hydrolyzate, with or without alkaline modifications, can be dried, provided drying is carried out under mild conditions as, for example, by spray drying. However, manufacturers of concrete and mortars usually prefer that the admixture be supplied as a liquid. In either case, the amount or "dosage" of the water reducing and retarding admixture employed in the practice of our invention is expressed as the percent by weight of hydrolyzate solids, based on the cement content of the portland cement composition.

Depending on the source of the hemicellulose, the method of its hydrolysis, the alkaline treatment (if any) of the hydrolyzate, the source and type of portland cement with which the admixture is employed and similar factors, the retardation effect of the various hydrolyzates employed in our process will vary somewhat from one sample to another. In general, a dosage of from about 0.10% to about 0.35% solids, based on cement, will effect a retardation in setting of most portland cement compositions of from 1 to 3 hours. An admixture having a relatively greater retardation effect will require a smaller dosage (say, a dosage of about 0.20% to effect a set retardation of about three hours) than will an admixture having a relatively smaller retardation effect (which may require a dosage of about 0.35% to effect the same degree of set retardation). Also, an increase in the dosage of a specific hydrolyzate within the range herein set forth will effect a roughly proportional increase in the length of time of set retardation, and a dosage in excess of that required to effect a set retardation of three hours obviously will increase the length of time of set retardation beyond this arbitrary limit.

The term, "portland cement compositions," as employed herein, includes portland cement concretes and mortars and all other portland cement-containing slurries which set up to form strong, rigid, monolithic compositions of matter.

The following example illustrates the preparation of a partial hydrolyzate from a softwood.

EXAMPLE 1

Southern yellow pine logs of three species, longleaf pine (*Pinus palustris*), slash pine (*Pinus elliottii*) and loblolly pine (*Pinus taeda*), were debarked and passed through a chipper to provide chips having the approximate size ½" x ¾" x ⅛". The chips were loaded into a digester and heated to 175° C. in 55 minutes by means of direct, saturated steam. During the next 45 minutes, while holding the temperature at 175° C., saturated steam was passed into the bottom of the digester and vapor was relieved from the top of the digester. Steaming was then discontinued, the digester was relieved and liquid (partial hydrolyzate) was drained from the bottom of the digester. This hydrolyzate, having a solids concentration of 8.5% solids, was concentrated under vacuum (i.e., at a temperature of 50–60° C.) in a forced circulation flash-type evaporator. The concentrated liquor, containing 63.1% solids, was designated Product A.

The modification of a softwood partial hydrolyzate by alkaline treatment under our preferred conditions is illustrated by the following example.

EXAMPLE 2

220 lb. of Product A (from Example 1) and 28.1 lb. of 49.5% NaOH solution were mixed. The resulting solution, having a temperature of 58° C., was transferred to a steam-jacketed, agitated reactor, heated to 90° C. with indirect steam, retained at 90° C. for 60 minutes, cooled to 25° C. and removed from the reactor. The reaction product, containing 56.9% solids, was diluted with 8.4 lb. of water to give Product B, having a solids concentration of 55.1%.

Analyses of effective wood hydrolyzate products obtained by steam treatment of southern pine chips followed by concentration only (Product A of Example 1) or by concentration and mild alkaline treatment (Product B of Example 2) follow:

TABLE I

| Constituent, percent (dry basis) | Product A | B |
|---|---|---|
| Glucose, mannose and galactose in polymeric form | 61 | 36 |
| Free hexoses | 8 | 3 |
| Free pentoses | 8 | 1 |
| Lignin | 8 | 8 |
| Lactonizable Hydroxy Acids | 4 | 10 |
| Sodium Salts of Volatile Acids | 1 | 13 |
| Other Constituents | 10 | 29 |
|  | 100 | 100 |

In the production of concrete, the hemicellulose-containing wood hydrolyzates are generally added to the mixing water in the form of concentrated solutions at dosages corresponding to 0.10–0.30% solids, based on cement. The use of such products in concrete is described in the the following example.

EXAMPLE 3

To demonstrate the utility of the products of the invention in the production of concrete, an unmodified hydrolyzate product (Product A of Example 1) or an alkaline-modified hydrolyzate product (Product B of Example 2) are preferably added to the mixing water, whereupon the resulting water reducing and retarding admixture solution is mixed into a preblended mixture of sand, cement and gravel to form the concrete batch. In order to obtain a set retardation of about two ehours (ASTM specification for water reducing and retarding admixtures, classification Type D, is 1–3 hours' retardation), admixtures A and B are added to the mixing water in amounts corresponding respectively to 0.20% and 0.25% (on a dry basis) of the cement in the batch. Typical results obained through the use of these products of invention at the aforementioned dosages and at two slump (workability) levels are given in Table II.

the cement factor (5.5 sacks of Type I portland cement per cubic yard) and workability (2.5 inches of slump)

TABLE II

| Product | Product Dosage, percent of cement | Slump, in. (±0.5") | Water Reduction, percent of mixing water | Retardation, hr. Initial Set | Retardation, hr. Final Set | Comprehensive Strength, p.s. 7-day Cure | Comprehensive Strength, p.s. 28-day cure |
|---|---|---|---|---|---|---|---|
| No admixture | 0.00 | 4.5 | 0.0 | 0.0 | 0.0 | 2,840 | 4,190 |
| Product A | 0.20 | 4.5 | 7.7 | 2.0 | 2.1 | 3,395 | 4,665 |
| Product B | 0.24 | 4.5 | 11.5 | 2.0 | 2.1 | 3,785 | 5,315 |
| No Admixture | 0.00 | 6.5 | 0.0 | 0.0 | 0.0 | 2,275 | 3,215 |
| Product A | 0.20 | 6.5 | 7.9 | 2.2 | 2.3 | 3,410 | 4,985 |
| Product B | 0.25 | 6.5 | 9.7 | 2.3 | 2.3 | 3,380 | 4,885 |

EXAMPLE 4

A number of water reducing and retarding admixture solutions were prepared or procured, some of these admixtures being simple sugars and some being the hydrolyzate and hydrolyzate derivatives employed in the practice of our invention. These admixtures comprised the following hydrolyzates and sugars:

were held constant. The percent reduction in mixing water, the retardation of set and the compressive strength of each batch were determined by standard methods and are reported in Table III. Set retardation in excess of about four hours is regarded as too great for practical purposes.

TABLE III

| Admixture Name | Dosage, percent of Cement | Water Reduction, percent | Set Retardation, hr. Initial Set | Set Retardation, hr. Final Set | Compressive Strength, percent of control 7-day cure | Compressive Strength, percent of control 28-day cure |
|---|---|---|---|---|---|---|
| None (control) | 0.00 | 0.0 | 0.0 | 0.0 | 100 | 100 |
| (a) Effective Products of the Invention (Practical Retardations) | | | | | | |
| Product A | 0.20 | 8.5 | 3.0 | 3.0 | 123 | 110 |
| Product B | 0.20 | 7.2 | 2.3 | 2.4 | 129 | 114 |
| Product C | 0.20 | 14.2 | 1.9 | 2.0 | 121 | 103 |
| Product D | 0.20 | 13.7 | 2.6 | 2.8 | 139 | 107 |
| Product E | 0.20 | 8.3 | 2.3 | 2.4 | 117 | 110 |
| (b) Unsuitable Products (Impractically High Retardation) | | | | | | |
| Product F | 0.20 | 4.9 | 22.8 | 27.9 | 117 | 110 |
| Product G | 0.20 | 3.8 | 6.1 | 8.0 | 122 | 111 |
| Product H | 0.20 | 4.7 | 6.6 | 8.1 | 133 | 110 |
| Product I | 0.20 | 2.7 | 6.0 | 6.4 | 117 | 110 |

Product A

Condensate from steam hydrolysis of softwood, as defined by Example 1.

Product B

Alkali-modified condensate from steam hydrolysis of softwood, as defined by Example 2.

Product C

Condensate from steam hydrolysis of hardwood (mixed gum woods) at 170° C.

Product D

Hydrolyzate (sold as wood molasses under the trade name "Masonex") from brief, very high temperature steam treatment (up to 282° C. for 1–2 min.) of mixed hard and soft woods in manufacture of hardboard.

Product E

Glucomannan and galactoglucomannan short-chain polymers isolated from Product A.

Product F—Sucrose

Product G—Glucose

Product H—Mannose

Product I

Maltose (dimer with alpha glycosidic linkage from hydrolysis of starch).

Uniform batches of portland cement, sand and gravel were prepared, and to the mixing water for each batch was added 0.020% (by weight solids, based on the cement content of the batch) of one of the aforementioned admixture products. One batch was also prepared without an admixture to serve as a control. In all batches, The data of Table III show that in concrete production, products of the invention effect a practical degree of set retardation and, by reducing water requirement for given workability (2½" slump), result in a substantial increase in compressive strength, whereas simple sugars give excessive retardation at the same dosage (0.20% solids, based on cement).

EXAMPLE 5

Several series of tests were carried out to determine the effect of an increase in dosage of our water reducing and set retarding admixtures on the water reduction, set retardation and compressive strength of standardized batches of portland cement concrete. In all instances, the cement factor (5.5 bags of Type I portland cement per cubic yard) and workability (2.5±0.5 inches slump) were the same. In the first two series of tests (reported in Tables IV and V below) the admixture was the non-alkalinized hydrolyzate (Product A) described in Example 1, the portland cement and aggregates for the first series of tests (Table IV) being obtained from southern California and the portland cement and aggregates for the second series of tests (Table V) being obtained from the Pacific Northwest. In the second and third series of tests (reported in Tables V and VI) the portland cement and aggregates were from the same sources in the Pacific Northwest, the admixture employed in the second series of tests (Table V) being the non-alkalinized hydrolyzate (Product A) described in Example 1 and the admixture employed in the third series of tests (Table VI) being the alkali-modified hydrolyzate (Product B) described in Example 2. The degree of water reduction (percent reduction of mixing water based on the mixing water content of the control batch), set retardation (measured from the time of initial and final set of the control batch) and the compressive strength (determined as the percentage of the compressive strength of the control batch) were determined by standardized procedures.

TABLE IV.—PORTLAND CEMENT COMPOSITION FROM SOUTHERN CALIFORNIA WITH PRODUCT A ADMIXTURE

| Admixture | | | Set Retardation, hr. | | Compressive Strength, percent of control | |
|---|---|---|---|---|---|---|
| Name | Dosage, percent of Cement | Water Reduction, percent | Initial Set | Final Set | 7-day cure | 28-day cure |
| None (control) | 0.00 | 0.0 | 0.0 | 0.0 | 100 | 100 |
| Product A | 0.10 | 5.6 | 2.3 | 2.0 | 128 | 109 |
|  | 0.20 | 9.0 | 5.6 | 6.1 | 145 | 140 |

TABLE V.—PORTLAND CEMENT COMPOSITION FROM PACIFIC NORTHWEST WITH PRODUCT A ADMIXTURE

| Admixture | | | Set Retardation, hr. | | Compressive Strength, percent of control | |
|---|---|---|---|---|---|---|
| Name | Dosage, percent of Cement | Water Reduction, percent | Initial Set | Final Set | 7-day cure | 28-day cure |
| None (control) | 0.00 | 0.0 | 0.0 | 0.0 | 100 | 100 |
| Product A | 0.10 | 2.6 | 0.7 | 0.6 | 129 | 132 |
|  | 0.15 | 5.4 | 1.3 | 1.3 | 138 | 135 |
|  | 0.20 | 6.8 | 2.5 | 2.6 | 128 | 126 |
|  | 0.25 | 8.0 | 3.6 | 3.7 | 140 | 130 |
|  | 0.30 | 9.0 | 5.2 | 5.4 | 130 | 126 |

TABLE VI.—PORTLAND CEMENT COMPOSITION FROM PACIFIC NORTHWEST WITH PRODUCT B ADMIXTURE

| Admixture | | | Set Retardation, hr. | | Compressive Strength, percent of control | |
|---|---|---|---|---|---|---|
| Name | Dosage, percent of Cement | Water Reduction, percent | Initial Set | Final Set | 7-day cure | 28-day cure |
| None (control) | 0.00 | 0.0 | 0.0 | 0.0 | 100 | 100 |
| Product B | 0.05 | 0.9 | 0.0 | -0.2 | 100 | 108 |
|  | 0.10 | 2.3 | 0.5 | 0.3 | 114 | 104 |
|  | 0.15 | 3.7 | 0.9 | 0.5 | 104 | 104 |
|  | 0.20 | 5.8 | 1.8 | 1.3 | 137 | 117 |
|  | 0.25 | 6.5 | 2.1 | 2.1 | 133 | 118 |
|  | 0.30 | 8.8 | 3.2 | 3.2 | 139 | 120 |
|  | 0.35 | 11.1 | 5.4 | 5.8 | 134 | 114 |

In all cases, an increase in the dosage of the water reducing and retarding admixture resulted in a progressive increase in the water reduction and retardation of set of the concrete batches. Comparison of the data in Tables IV and V indicates that the same admixture will have a different retardation effect on portland cement and aggregates obtained from different sources, the retardation effect of Product A admixture on standard batches of portland cement concrete from Southern California being greater than its retardation effect on standard batches of portland cement concrete from the Pacific Northwest. Comparison of the data in Tables V and VI verifies the fact that an alkali-modified hydrolyzate has somewhat less retardation effect than an unmodified hydrolyzate has on the same portland cement composition, the retardation effect of Product A (unmodified hydrolyzate) on standard batches of Pacific Northwest portland cement concrete being greater than the retardation effect of Product B (alkali-modified hydrolyzate) on standard batches of the same portland cement concrete.

In addition, in all cases a dosage falling within the range of from 0.10 to 0.35% hydrolyzate solids, based on cement, was required to effect a retardation of between 1 to 3 hours (the arbitrary limits of set retardation established for Type D water reducing and retarding admixtures). Specifically, in the case of the Southern California portland cement composition, a dosage of from about 0.10% to 0.12% of Product A was required and, in the case of the Pacific Northwest portland cement composition, dosages of from about 0.12% to 0.27% of Product A and from about 0.16% to 0.28% of Product B were required to effect a set retardation within this arbitrary period of time.

We claim:

1. The improved portland cement slurry composition which includes a water reducing and retarding admixture comprising a hydrolyzate consisting predominantly of short chain polymers of the non-cellulose carbohydrate constitutents resulting from the partial hydrolysis of wood with a hydrolyzing agent selected from the group consisting of hot water and steam, said hydrolyzate being present in an amount sufficient to effect retardation of setting of said composition.

2. The improved composition of claim 1 in which the admixture hydrolyzate comprises partially hydrolyzed hemicelluose.

3. The improved composition of claim 1 in which the admixture hydrolyzate is obtained by the steam hydrolysis of wood chips.

4. The improved composition of claim 1 in which the admixture is a hydroyzate, obtained by the partial hydrolysis of wood, the free sugar content of which has been reduced by treatment of the hydrolyzate with an alkaline reagent.

5. The improved composition of claim 1 in which the admixture is a hydrolyzate that has been treated with an alkaline reagent selected from the group consisting of alkali metal hydroxides and alkaline earth metal hydroxides.

6. The improved composition of claim 1 in which from about 0.10% to 0.35% by weight hydrolyzate solids, based on the cement content of the composition, is included in the composition.

7. The improved composition of claim 1 in which the admixture hydrolyzate comprises partially hydrolyzed hemicelluloses, comprising predominantly galactoglucomannans and glucomannans, which are included in said composition at a dosage range of from about 0.10% to 0.35% hydrolyzate solids based on the cement content of the composition.

8. The improved composition of claim 7 in which the admixture hydrolyzate comprises partially hydrolyzed hemicelluloses the simple sugar content of which has been minimized by treatment with an alkaline reagent.

9. The improved composition of claim 1 in which the admixture hydrolyzate comprises partially hydrolyzed hemicelluloses, comprising predominantly O-acetyl-4-O-methyl-glucuronoxylans and partially deacetylated derivatives theerof, which are included in said composition at a dosage range of from about 0.10% to 0.35% hydrolyzate solids based on the cement content of the composition.

10. The improved composition of claim 9 in which the admixture hydrolyzate comprises partially hydrolyzed hemicelluloses the simple sugar content of which has been minimized by treatment with an alkaline reagent.

11. The improved portland cement concrete composition consisting essentially of portland cement, sand and gravel having incorporated therein, in an amount sufficient to effect retardation of setting of the composition, a dilute aqueous solution of water reducing and retarding admixture comprising a hydrolyzate composed predominantly of partially hydrolyzed hemicelluloses resulting from the steam hydrolysis of wood chips.

12. The improved composition of claim 11 in which the admixture hydrolyzate comprises partially hydrolyzed hemicelluloses the free sugar content of which has been minimized by treatment with an alkaline reagent.

References Cited

UNITED STATES PATENTS

| | | | |
|---|---|---|---|
| 2,418,431 | 4/1947 | Scripture | 106—92 |
| 2,690,975 | 10/1954 | Scripture | 106—90 |
| 2,823,135 | 2/1958 | Toulmin | 106—92 |
| 2,860,060 | 11/1958 | Benedict et al. | 106—90 |
| 2,927,033 | 3/1960 | Benedict et al. | 106—90 |
| 3,332,791 | 7/1967 | Steinberg et al. | 106—92 |

FOREIGN PATENTS 562,141    12/1942    Great Britain.

TOBIAS E. LEVOW, Primary Examiner

W. T. SCOTT, Assistant Examiner

U.S. Cl. X.R.

106—315

PO-1050
(5/69)

UNITED STATES PATENT OFFICE
CERTIFICATE OF CORRECTION

Patent No. 3,520,707   Dated July 14, 1970

Inventor(s) John C. Steinberg, Kenneth R. Gray and John Kelvin Hamilto

It is certified that error appears in the above-identified patent and that said Letters Patent are hereby corrected as shown below:

Column 1, lines 13, 14, 31, 33, 51, 57, "portland" should read -- Portland --.

Column 3, lines 37, 40, 46, 60, 61, 62, "portland" should read -- Portland --.

Column 4, line 68, "ehours" should read -- hours --.

Columns 5-6, Table II, last titled column, "Comprehensive Strength, p.s." should read -- Comprehensive Strength, p.s.i. --.

Column 5, line 70, "portland" should read -- Portland --.

Column 5, line 72, "0.020%" should read -- 0.20% --.

Column 6, lines 1, 51, 52, 57, 59, 62, "portland" should read -- Portland --.

Column 7, lines 42, 45, 47, 51, 53, 56, 63, 65, "portland" should read -- Portland --.

Column 7, claim 1, line 71, "portland" should read -- Portland --.

Column 9, claim 11, lines 8 and 9, "portland" should read --Portland-

SIGNED AND
SEALED
OCT 20 1970

(SEAL)
Attest:

Edward M. Fletcher, Jr.
Attesting Officer

WILLIAM E. SCHUYLER, JR.
Commissioner of Patents